Sept. 15, 1936.   P. B. STREANDER   2,054,395
APPARATUS FOR AERATING SEWAGE AND THE LIKE
Filed March 8, 1935   3 Sheets-Sheet 1
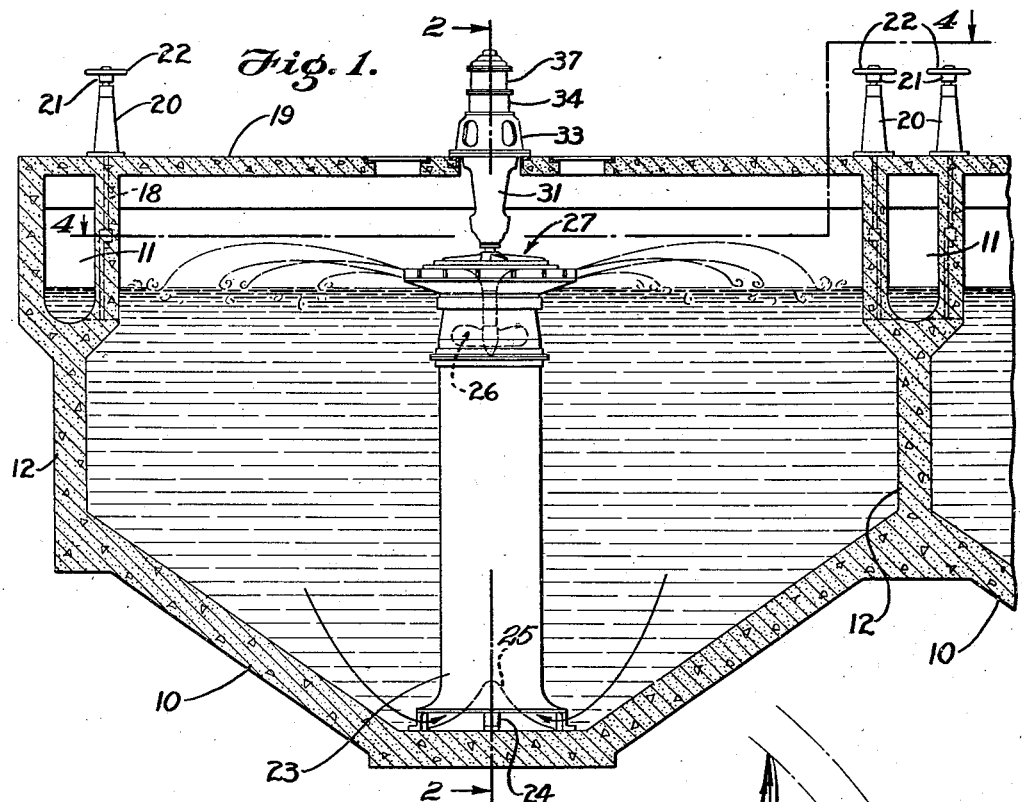
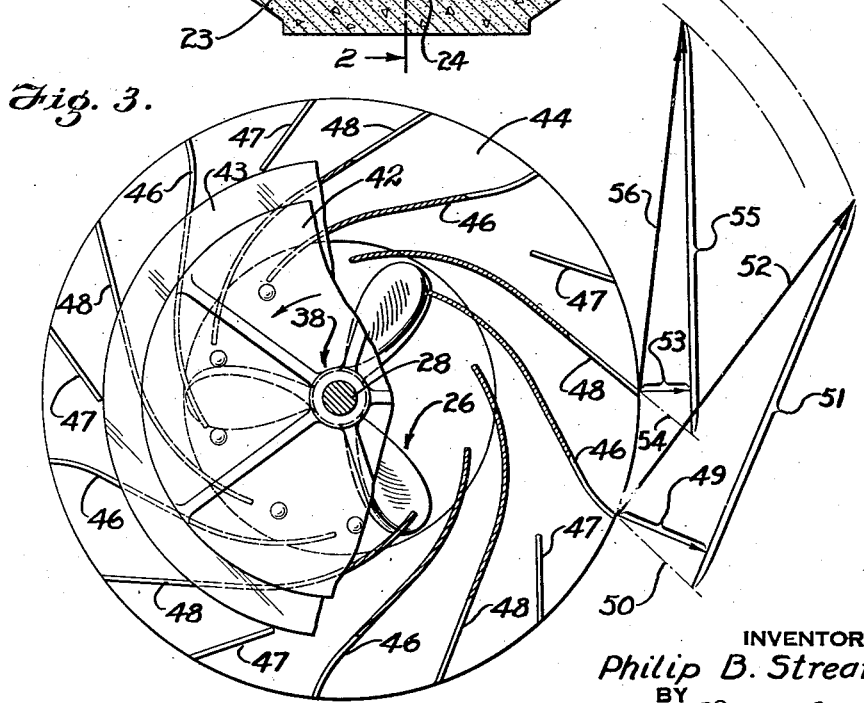
INVENTOR
Philip B. Streander
BY
Louis L. Ansart
his ATTORNEY

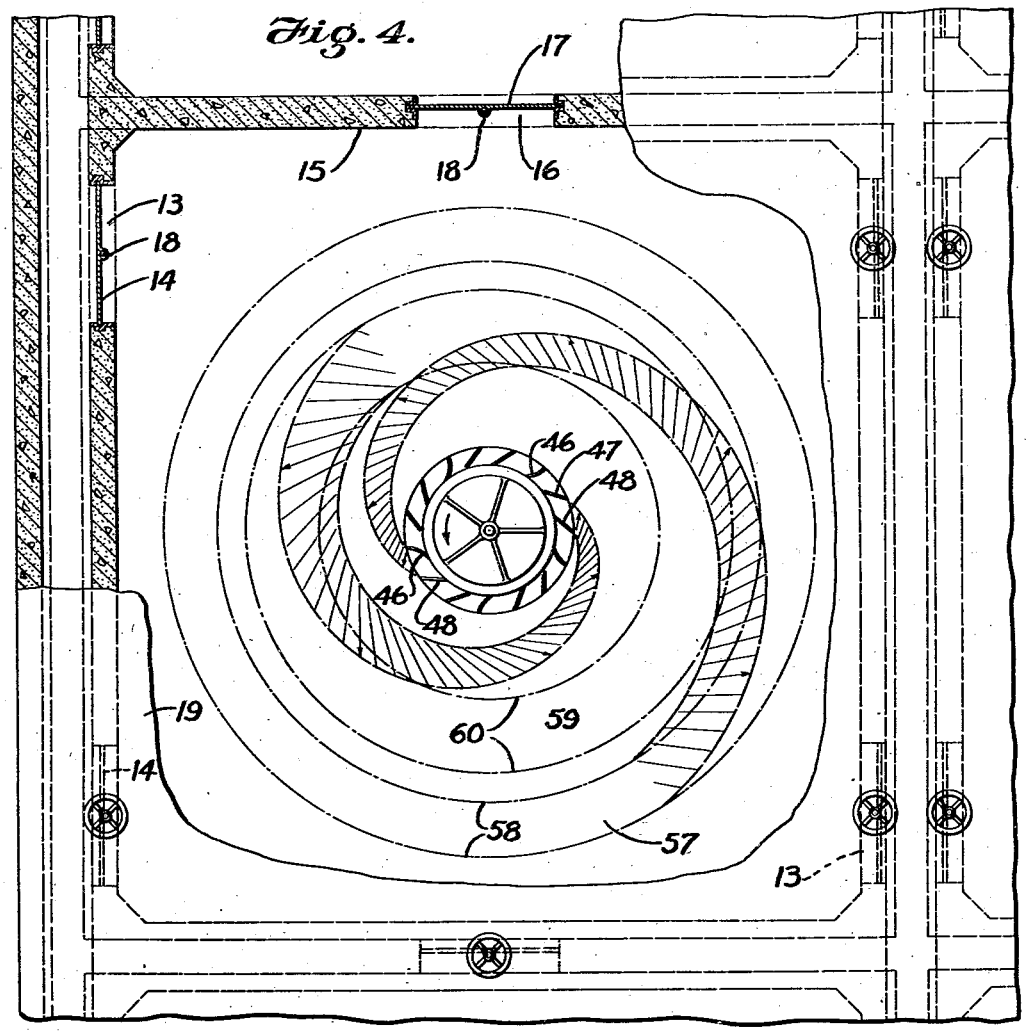

Patented Sept. 15, 1936

2,054,395

UNITED STATES PATENT OFFICE 2,054,395

APPARATUS FOR AERATING SEWAGE AND THE LIKE

Philip B. Streander, Scarsdale, N. Y., assignor, by mesne assignments, to Underpinning & Foundation Company, Inc., New York, N. Y., a corporation of New York Application March 8, 1935, Serial No. 10,008

7 Claims. (Cl. 210—8)

This invention relates to sewage treatment and more particularly to the aeration of sewage as, for example, in connection with the activated sludge treatment of sewage.

Sewage containing suspended and colloidal solids, if thoroughly agitated for a sufficient length of time, assumes a flocculent appearance. In the flocculi thus formed, bacteria gather in immense numbers either by being strained out of the sewage or by growth in the flocculi, and the usual suspended particles grow by accretion of the material. Activated sludge is a biologically active sludge which may contain large numbers of active, growing, microscopic organisms ranging in varieties from true bacteria up through the giant bacteria, and also a variety of free and attached protozoa. Such organisms, which take their food from the colloidal and dissolved matter and the salts present in the sewage, are aerobic in action, that is they must have oxygen in order to continue their functioning. It is therefore very important to agitate the mixture of sludge and sewage to maintain the sludge in suspension and in continuous contact with oxygen, either atmospheric or dissolved. By continuous mechanical mixing of the sewage, there is effected a continuous breaking up of the oxygen-saturated surface films into small masses of liquids, which are brought into contact with less saturated masses with an intimacy and a frequency depending upon the degree of agitation.

In aeration by surface contact of the atmosphere with sewage in a tank, the atmospheric oxygen must saturate the sewage below the surface of contact and then diffuse to the activated sludge particles which, in turn must reach the colloidal particles in order to bring about flocculation and absorption. Such results may be attained by stirring and agitation of the sewage which also produces the essential result of maintaining the sludge in suspension. If the sludge were allowed to stand without agitation it would soon begin to putrefy and re-disperse whereby the work done in building up the sludge would be lost. The requisite length of stirring or agitation is dependent upon various factors such as the strength of the sewage and may be further influenced by industrial wastes, the presence and character of which may have a large bearing on the time required for agitation or aeration. Absorption of oxygen by means of aeration is proportional to the deficit in saturation of the sewage, and deoxygenation, or the rate of biochemical oxidation of the organic matter, is proportional to the remaining unoxydized substances. Aeration and agitation are therefore functional components of this process.

An important object of the invention relates to the provision of a novel and advantageous method of aeration of sewage and the like and another important object of the invention relates to the provision of novel and advantageous apparatus which will effectively promote aeration and agitation of sewage and the like.

According to a preferred embodiment of the apparatus of the present invention, there are combined in a single compact machine certain hydraulic units including a draft tube, a propeller placed below the liquid level and an impeller placed at or above the liquid level and forming part of an aerating head. The propeller acts not only to lift the sewage into the hydraulic range of the impeller but acts as a balancing wheel or turbine whereby only a predetermined amount of sewage is permitted to flow up the tube. The vanes in the impeller are designed to secure varying velocities through the passages between the vanes so as to produce a full spray with minimum and maximum points of contact with the sewage. The sewage lifted into the aerating head leaves the impeller in a thin sheet and each particle of the sewage traverses a path at a magnitude and direction of flow produced by the relative and absolute velocities of exit from the propeller. The motion of the spray has the effect of setting up a slow circular flow motion in the sewage in the tank from which it was drawn and to which it is returned. Inasmuch as the apparatus has a positive lifting and aerating capacity, its operation is not affected by variation of sewage level in the tank.

Other features, objects and advantages will appear upon consideration of the following description and of the drawings, in which Fig. 1 is vertical section of a tank in which is installed a preferred embodiment of the aerating means of the present invention;

Fig. 3 is a section taken along the line 3—3 of Fig. 2; and

Fig. 4 is a section taken along the line 4—4 of Fig. 1.

Figure 2:
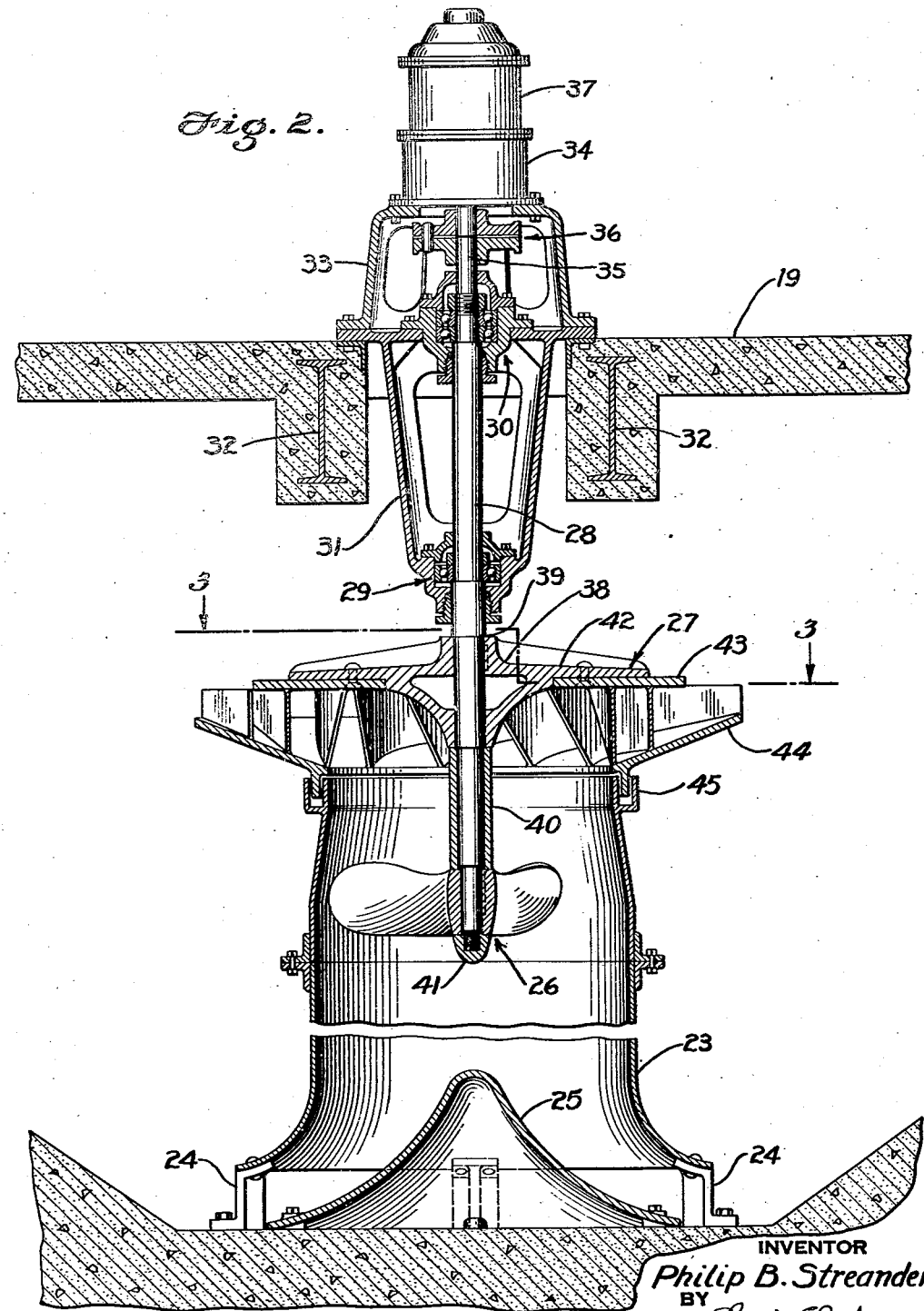
Fig. 2 is a vertical section along the line 2—2 of Fig. 1.

Referring to the drawings, numeral 10 designates a tank equipped with a preferred embodiment of the aerator of the present invention. Preferably each tank 10 is square to enable a plurality of tanks to be arranged compactly together in a battery with channels 11 in walls 12 thereof connected with the tanks by openings 13 controlled by suitable means such as sliding gates 14, and with walls 15 separating successive tanks and provided with openings 16 controlled by gates 17. It will be seen that sewage may be passed through the openings 13 either from the channels 11 to the tanks 10 or from the tanks 10 to the channels 11, and that sewage may conveniently be passed from tank to tank through openings 16 if it be desired to aerate the sewage in a plurality of tanks or units in succession.

The gates 14 and 17 are closed when in their lowermost positions and may be opened to the desired extents by tension members or rods 18 attached at their lower ends to the gates and extending upwardly through a deck 19 and standards 20 on said deck, the upper ends of said rods 18 being screw-threaded and having thereon nuts 21 provided with hand wheels 22 and engaging the tops of standards 20 whereby the gates may be raised or lowered by turning said hand wheels 22.

Preferably the tanks 10 and deck 19 are built of concrete and the tanks have hopper bottoms thereby facilitating the installation and operation of centrally positioned aerator units. As illustrated most clearly in Fig. 2, each aerator unit includes a round draft pipe 23 of which the outwardly flared lower end is supported above the central part of the hopper-shaped bottom of the tank by suitable legs 24 to permit the free passage of the liquid, such as sewage, into the lower end of the draft pipe. To assure a relatively smooth passage of the liquid into the lower end of the draft pipe, use may be made of a deflector 25 by which the stream of liquid is gradually turned upwardly so as to flow smoothly into the lower end of the draft pipe.

The sewage is drawn upwardly in the draft tube 23 by means of a propeller 26 and is thrown outwardly and spirally from the top of the draft tube by means of an impeller 27. As illustrated the propeller 26 and the impeller 27 are mounted on a shaft 28 rotatable in bearing assemblages 29 and 30 at the bottom and top, respectively, of a supporting spider or bearing housing 31, the assemblage 29 serving as an alignment bearing and the assemblage 30 serving not only as an alignment bearing but also as a thrust bearing to prevent axial movement of the shaft 28 and support both the propeller and the impeller of the spray head. The spider 31 may be flanged at its upper end to rest upon the deck 19 preferably reinforced as by I-beams 32 encased in the concrete. Mounted on the spider 31 is a sub-base 33 which in turn supports a gear drive 34 for a shaft 35 connected by a flexible connection 36 with the shaft 28, and a variable speed electric motor 37 above said gear drive and connected thereto for operating the same.

The impeller 27 may be formed with a supporting hub 38 rotatable by the shaft 28 by means of a suitable connection, such as a key on the shaft and a keyway in the hub. The hub may be held against a shoulder 39 by means of a spacing sleeve 40 fitting around a smaller portion of the shaft 28, the hub of the propeller on a still smaller portion of the shaft and keyed thereto, and a cap 41 screwed on the lower end of the shaft and supporting the propeller, sleeve and impeller hub. The surfaces of these parts should be so related as not to interfere substantially with the smooth flow of liquid, the lower side of the propeller hub being shaped to gradually deflect the liquid outwardly between the impeller vanes, the arrangement and mounting of which will shortly be described.

The hub 38 is provided with a flat portion or portions 42 extending outwardly therefrom and substantially in a plane perpendicular to the shaft 28. Secured to the flat portion 42 at its lower side is an annular member 43 fitting into a recess in the portion 42 so that the lower surface of said annular member forms a continuation of the outwardly flared liquid-deflecting surface of the hub. Suspended from the annular member 43 by impeller vanes, which will shortly be described is an annular member 44 having frusto-conical upper and lower surfaces. At its inner edge the member 44 and the upper edge of the draft tube 23 are suitably connected, as by a labyrinth seal 45.

As best illustrated in Fig. 3, there may be three kinds of blades 46, 47 and 48 arranged in sets of three and acting in this order as the impeller turns in the direction indicated by the arrow. At its lower edge each of the vanes 46 and 48 starts at the inner edge of the member 44, and at its upper edge each of said vanes starts at a point closer to the shaft 28 than such inner edge, whereby the inner edge of each of these blades is inclined with respect to the shaft so as to receive the liquid there-between in an advantageous manner. Both kinds of vanes 46 and 48 extend outwardly to the outer edge of the member 44. The vanes 47, however, extend only from the outer edge of the member 43 to the outer edge and serve to assist in controlling the discharge of liquid in the discharge openings between the blades 46 and the following blades 48, such discharge openings being wider than those between blades 48 and the following blades 46 due to the greater backward curve of blades 48 whereby they will not throw the liquid as far from the shaft 28 as will the vanes 46.

The action of each blade 46 is indicated in a velocity diagram (Fig. 3) in which 49 is the radial velocity, 50 is the velocity in the direction in which the liquid leaves the impeller, 51 is the peripheral velocity, and 52 is the absolute velocity. The action of each blade 48 is indicated in a velocity diagram in which 53 is the radial velocity, 54 is the velocity in the direction in which the liquid leaves the impeller, 55 is the peripheral velocity, and 56 is the absolute velocity.

In the operation of a unit such as shown in Fig. 1, the motor 37 is run at the proper speed and rotates the propeller 26 to cause a downward flow from the tank into the lower end of the draft tube 23 and an upward flow through the tube 23 past the propeller to the impeller 27 which throws the sewage out in thin sheets which fall upon the surface of the sewage in the tank. In its passage through the air, the oxygen-deficient sewage picks up oxygen and carries it down into the tank where it promotes the work of aerobic bacteria. As illustrated in Fig. 4, the stream thrown outwardly by each vane 46 at any instant lags behind the impeller in a generally spiral direction but gradually spreads in width and moves outwardly, as indicated by the arrows with their heads at the outer edge of the stream, until it reaches the limit of its range from the impeller and falls on the surface of the sewage approximately in an annular patch 57 bounded by circles 58. Actually there is no definite separation of streams but the streams from the various blades 48 combine into a substantially continuous sheet. The streams from the blades 48 are, however, not thrown so far from the impeller and fall substantially in an annular path 59 bounded by circles 60.

The spiral motion of the sewage from the spray-head imparts a circular motion to the sewage in the tank and this in connection with the downward pull of the sewage, due to the upward flow in the tube, causes the sewage to flow downwardly with a slow spiral motion.

Of course the motor 37 might be a constant speed motor but by using a variable speed motor or drive the spray-head may be operated at a speed and capacity arranged to meet the demands under varying conditions such as variations in flow, thereby effecting substantial savings in power. The variable speed feature may also be used to satisfy the varying oxygen demands of the sewage. When returned activated sludge is first mixed with the incoming sewage there is a heavy demand by the sewage on the dissolved oxygen in the activated sludge. This can be met by operating the first unit or units of a series at the maximum speed thereby securing maximum aeration, and as the oxygen demand is thus partially satisfied, the balance of the units may be operated at decreasing speeds until the last unit is reached. This manner of operation also assists in reducing the power requirements for treating the sewage.

It should be understood that various changes may be made in different features and that various features may be used without others without departing from the true spirit and scope of the invention.

Having thus described my invention, I claim:

1. The combination of a shaft having a shoulder, an impeller having a hub mounted on said shaft with its upper end against said shoulder and having its lower surface curved to turn liquid gradually outwardly, a sleeve on said shaft with one end against the lower end of the impeller hub and with its peripheral surface merging with the lower curved surface of the impeller hub, a propeller with its hub mounted on said shaft and having its outer surface merging smoothly with that of the sleeve, and a cap on the end of the shaft below the propeller hub and having a curved surface to direct liquid smoothly to said propeller hub.

2. An aerator impeller having at its bottom an inlet, a centrally located part above said inlet shaped to gradually turn outwardly from the axis of said inlet, liquid flowing upwardly through said inlet, an annular portion to limit upward movement of such outwardly turned liquid, an inverted frusto-conical part extending outwardly from the periphery of the upper end of said inlet, and vanes extending from the inner edge of said frusto-conical part to the outer edge thereof and arranged in pairs with different curvatures whereby alternate vanes will throw out liquid to a predetermined distance and the other vanes will throw out liquid to a different predetermined distance.

3. An aerator impeller having at its bottom an inlet, a centrally located part above said inlet shaped to turn upwardly-flowing liquid gradually outwardly from the axis of said inlet, an annular part around said centrally located part to limit upward movement of such outwardly turned liquid, a part having an inverted frusto-conical upper surface extending outwardly from said inlet beyond the peripheral edge of said annular part, vanes extending from the inner edge to the outer edge of said frusto-conical surface and arranged in pairs with the blades of each pair differing in curvature to throw liquid to different distances from the axis of said inlet, and short vanes extending from the outer edge of said annular part to the outer edge of said frusto-conical surface between each blade of greater range and the next following blade of lesser range.

4. An aerator impeller having at its bottom an inlet, a centrally located part above said inlet shaped to turn upwardly-flowing liquid gradually outward from the axis of said inlet, an annular part having its lower surface in position to engage the upper surface of the outwardly flowing liquid, a part having an inverted frusto-conical upper surface extending outwardly from said inlet, and vanes extending from said frusto-conical surface to the lower surface of said annular part and from the inner to the outer edge of said frusto-conical surface.

5. An aerator impeller having at its bottom an inlet, a centrally located part above said inlet shaped to turn upwardly-flowing liquid gradually outward from the axis of said inlet, an annular part having its lower surface in position to engage the upper surface of the outwardly flowing liquid, a part having an inverted frusto-conical upper surface extending outwardly from said inlet, and vanes extending from said frusto-conical surface to the lower surface of said annular part and from the inner to the outer edge of said frusto-conical surface, said vanes being arranged in groups each of which contains a plurality of vanes of different curvature adapted to throw liquid to different distances from the axis of the impeller.

6. An aerator impeller having a central inlet at its bottom, a plurality of vanes arranged around the axis of said impeller with their inner ends projecting into the space above said inlet, and liquid restraining means above and below said vanes, said vanes being arranged in groups, each of which contains a plurality of vanes of different curvature adapted to throw liquid corresponding different distances from the axis of the impeller.

7. An aerator impeller having at its bottom an inlet, vanes extending outwardly from said inlet and arranged in pairs with the blades of each pair differing in curvature to throw liquid to different distances from the axis of said inlet, and short vanes between the outer ends of each blade of greater range and the next following blade of lesser range.

PHILIP B. STREANDER.